US011945376B1

(12) United States Patent
Lin (10) Patent No.: US 11,945,376 B1
(45) Date of Patent: Apr. 2, 2024

(54) RECREATIONAL VEHICLE CAMERA WITH MARKER LIGHT (71) Applicant: HALOVIEW TECHNOLOGY CO., LIMITED, Kowloon (CN)

(72) Inventor: Xiangwen Lin, Kowloon (CN)

(*) Notice: Subject to any disclaimer, the term of this patent is extended or adjusted under 35 U.S.C. 154(b) by 0 days.

(21) Appl. No.: 18/119,176

(22) Filed: Mar. 8, 2023

(30) Foreign Application Priority Data

Feb. 1, 2023 (CN) .......................... 202320116672.3

(51) Int. Cl.
B60R 11/04 (2006.01)
H04N 23/51 (2023.01)
H04N 23/57 (2023.01)

(52) U.S. Cl.
CPC ............ *B60R 11/04* (2013.01); *H04N 23/51* (2023.01); *H04N 23/57* (2023.01)

(58) Field of Classification Search
CPC ......... B60R 11/04; H04N 23/51; H04N 23/57
USPC ....................................................... 396/428
See application file for complete search history.

(56) References Cited

U.S. PATENT DOCUMENTS

| 8,544,643 | B2 | * | 10/2013 | Yim | ........................ | G03B 17/08 |
| | | | | | | 396/25 |
| 8,581,982 | B1 | * | 11/2013 | Haley | ........................ | B60R 1/00 |
| | | | | | | 348/148 |
| D745,913 | S | * | 12/2015 | Cho | ............................. | D16/218 |
| D759,144 | S | * | 6/2016 | Cho | ............................. | D16/218 |
| D898,798 | S | * | 10/2020 | Xiong | ........................ | D16/202 |
| D907,012 | S | * | 1/2021 | Bell | ............................. | D14/224 |
| D907,098 | S | * | 1/2021 | Xiong | ........................ | D16/208 |
| D945,511 | S | * | 3/2022 | Yu | ................................. | D16/203 |
| D948,593 | S | * | 4/2022 | Luo | ............................. | D16/208 |
| D963,727 | S | * | 9/2022 | Lin | ............................. | D16/214 |
| D963,728 | S | * | 9/2022 | Liu | ............................. | D16/203 |

(Continued)

FOREIGN PATENT DOCUMENTS

CN 201604592 U * 10/2010
CN 201751873 U * 2/2011

(Continued)

OTHER PUBLICATIONS

Haloview Technology, https://www.haloview.com/byte-tango-7-plus.html, 2022 Saved 1 time Dec. 6, 2022, 21 pg(s) (Year: 2022).*

(Continued)

*Primary Examiner* — Stephanie E Bloss
*Assistant Examiner* — Kevin C Butler (57) ABSTRACT The present disclosure provides a recreational vehicle camera with a marker light. The recreational vehicle camera with a marker light includes a mounting housing, a lamp body assembly, a camera assembly, and a rear mounting cover. The mounting housing is provided with an accommodating cavity, a first routing hole and a second routing hole. The lamp body assembly is provided with a first cable. The camera assembly is provided with a second cable. The rear mounting cover is provided with a first cable outlet hole. The rear mounting cover is used for being fixedly connected to a recreational vehicle. The rear mounting cover detachably covers the accommodating cavity. The first cable and the second cable are threaded out of the first cable outlet hole and are electrically connected to a circuit in the recreational vehicle.

16 Claims, 8 Drawing Sheets (56) References Cited

U.S. PATENT DOCUMENTS

| | | | |
|---|---|---|---|
| D970,581 S * | 11/2022 | Luo | D16/202 |
| D970,584 S * | 11/2022 | Luo | D16/202 |
| 11,523,488 B1 * | 12/2022 | Recker | H05B 47/105 |
| D983,857 S * | 4/2023 | Lin | D12/400 |
| 2003/0214733 A1 * | 11/2003 | Fujikawa | B60R 1/00 359/838 |
| 2005/0200494 A1 * | 9/2005 | Herrmann | G08B 13/19619 340/541 |
| 2006/0171704 A1 * | 8/2006 | Bingle | B60R 11/04 396/419 |
| 2006/0262545 A1 * | 11/2006 | Piepgras | F21S 8/06 362/373 |
| 2007/0172227 A1 * | 7/2007 | Droege | G03B 17/02 396/419 |
| 2007/0237517 A1 * | 10/2007 | Park | G03B 17/00 396/427 |
| 2010/0129070 A1 * | 5/2010 | Balasundaramohan | G03B 17/00 396/419 |
| 2010/0238292 A1 * | 9/2010 | Sato | B60R 1/00 348/148 |
| 2010/0265328 A1 * | 10/2010 | Chou | H04N 23/45 348/373 |
| 2012/0310519 A1 * | 12/2012 | Lawlor | B60R 1/12 248/205.3 |
| 2013/0107110 A1 * | 5/2013 | Park | H04N 23/51 348/373 |
| 2013/0170240 A1 * | 7/2013 | Ballatan | B60Q 1/56 362/497 |
| 2013/0242582 A1 * | 9/2013 | Schofield | G06V 10/147 362/466 |
| 2014/0300742 A1 * | 10/2014 | Han | H04N 23/51 348/148 |
| 2015/0124100 A1 * | 5/2015 | McRory | H04N 23/50 348/151 |
| 2016/0044281 A1 * | 2/2016 | Canfield | H04N 7/181 348/151 |
| 2016/0090132 A1 * | 3/2016 | Ramsey | H04N 23/11 348/148 |
| 2018/0334081 A1 * | 11/2018 | Bell | B60R 11/04 |
| 2019/0319345 A1 * | 10/2019 | Bell | H01Q 9/0407 |
| 2020/0225562 A1 * | 7/2020 | Zheng | H04N 23/45 |
| 2021/0272432 A1 * | 9/2021 | Omata | G08B 13/19619 |
| 2021/0362661 A1 * | 11/2021 | Gorgees | B60R 11/04 |

FOREIGN PATENT DOCUMENTS

| | | | | |
|---|---|---|---|---|
| CN | 205524012 U | * | 8/2016 | |
| CN | 208489936 U | * | 2/2019 | |
| CN | 109572582 A | * | 4/2019 | B60R 11/04 |
| CN | 209946614 U | * | 1/2020 | G03B 17/08 |
| CN | 214372441 U | * | 10/2021 | |
| CN | 216118194 U | * | 3/2022 | |
| CN | 217273410 U | * | 8/2022 | |
| EP | 1103420 A2 | * | 5/2001 | B60Q 3/258 |
| ES | 2398717 T3 | * | 3/2013 | F21V 15/01 |
| ES | 2938275 A1 | * | 4/2023 | |
| JP | 2019164916 A | * | 9/2019 | B60Q 1/0023 |
| JP | 2020525982 A | * | 8/2020 | F21S 8/08 |
| JP | 2021099387 A | * | 7/2021 | |
| KR | 20190079925 A | * | 12/2017 | B60R 11/04 |
| KR | 102502389 B1 | * | 5/2022 | G03B 11/04 |
| WO | WO-0164481 A2 | * | 9/2001 | B60C 23/00 |
| WO | WO-2008048370 A2 | * | 4/2008 | B60Q 1/0023 |
| WO | WO-2017028984 A1 | * | 2/2017 | B60R 11/04 |

OTHER PUBLICATIONS

Tadibrothers.com, https://www.tadibrothers.com/products/furrion-compatible-digital-2-pack-built-in-premium-side-rv-camera-wireless-side-marker, Saved 4 times between Jun. 24, 2021 and Jan. 27, 2023., 10 pg(s) (Year: 2021).*

Furion.com, https://furrion.com/products/vision-s-7-four-camera-observation-system Saved 8 times between Sep. 30, 2020 and Mar. 29, 2023, 10 pg(s) (Year: 2020).*

Etraiiler.com, https://www.etrailer.com/RV-Camera-System/Furrion/FR98NR.html, Saved 2 times between Oct. 27, 2021 and Nov. 27, 2022, 14 pg(s) (Year: 2021).*

* cited by examiner

RECREATIONAL VEHICLE CAMERA WITH MARKER LIGHT

CROSS-REFERENCE TO RELATED APPLICATIONS

The application claims priority of Chinese patent application 2023201166723, filed on 2023 Feb. 1, which is incorporated herein by reference in its entireties.

TECHNICAL FIELD

The present disclosure relates to the technical field of recreational vehicle cameras, in particular, to a recreational vehicle camera with a marker light.

BACKGROUND

A recreational vehicle has two functions of being a "house" and a "vehicle", but it is mainly a vehicle. A recreational vehicle is a mobile vehicle with basic facilities necessary for home. With the popularity of self-driving tour, the recreational vehicle is gradually popular. However, since the recreational vehicle is usually used for travel, the recreational vehicle often needs to be parked in a strange environment, which will bring insecurity to people. Moreover, the existing recreational vehicle in the market usually does not have a sufficient monitoring system. Particularly, there is no effective monitoring measure at a rear side of the recreational vehicle, which seriously affects the safety of users' driving and accommodation.

For this reason, people will usually install recreational vehicle cameras. However, the existing recreational vehicle cameras on the market are usually difficult to install, and connection cables need to be connected to the outside. The connection cables are usually exposed out of the camera, so that the connection cables are easy to damage, which affects the monitoring effect, and the connection cables are easy to age, which affects the service life of the camera.

Therefore, the present disclosure provides a recreational vehicle camera with a marker light, which can effectively solve the above problems, and is simple in structure, convenient to install and reasonable in wiring.

SUMMARY

In order to overcome the shortcomings in the prior art, the present disclosure provides a recreational vehicle camera with a marker light, which is simple in structure, convenient to install and reasonable in wiring.

The technical solution adopted by the present disclosure to solve the technical problem is as follows: a recreational vehicle camera with a marker light including a mounting housing, wherein the mounting housing is provided with an accommodating cavity, a first routing hole and a second routing hole, and both the first routing hole and the second routing hole are communicated to the accommodating cavity; a lamp body assembly, wherein the lamp body assembly is provided with a first cable; the lamp body assembly is mounted on one side of the mounting housing close to the first routing hole; the first cable extends through the first routing hole to the accommodating cavity; a camera assembly, wherein the camera assembly is provided with a second cable; the camera assembly is mounted on one side of the mounting housing close to the second routing hole; the second cable extends through the second routing hole to the accommodating cavity; and a rear mounting cover, wherein the rear mounting cover is provided with a first cable outlet hole; the rear mounting cover is used for being fixedly connected to a recreational vehicle; the rear mounting cover detachably covers the accommodating cavity; and the first cable and the second cable are threaded out of the first cable outlet hole and are electrically connected to a circuit in the recreational vehicle.

As the improvement of the present disclosure, an insertion block is arranged at one end of the rear mounting cover; a clamping block is arranged at the other end of the rear mounting cover; an insertion hole is formed in one end of the mounting housing; a clamping slot is formed in the other end of the mounting housing; the insertion block is inserted into the insertion hole; and the clamping block is clamped to the clamping slot.

As the improvement of the present disclosure, the mounting housing further includes a first fixing member; a first cable collection slot is arranged in the accommodating cavity; the first cable and the second cable are disposed in a manner of passing through the first cable collection slot; the first fixing member is connected to an inner wall of the accommodating cavity and presses the first cable and the second cable.

As the improvement of the present disclosure, further including a mounting pad, wherein the mounting pad is provided with a second cable outlet hole; the second cable outlet hole corresponds to the first cable outlet hole; and the mounting pad is mounted between the rear mounting cover and an outer wall of the recreational vehicle.

As the improvement of the present disclosure, the camera assembly includes a mounting seat, a camera and an antenna; the antenna is arranged at a top of the mounting seat; the mounting seat is provided with a shaft hole; the camera is provided with a rotating shaft; the rotating shaft is inserted into the shaft hole; and the camera is rotatably connected to the mounting seat.

As the improvement of the present disclosure, a stop block is arranged on one side of the mounting seat facing the camera in a protruding manner; several stop slots are arranged on a surface of the camera; and when the camera rotates relative to the mounting seat, the stop block slides on surfaces of the stop slots.

As the improvement of the present disclosure, the antenna includes a mounting portion and a main body portion; the main body portion is rotatably connected to the mounting portion; and the mounting portion is mounted on the mounting seat.

As the improvement of the present disclosure, the mounting seat is provided with a third routing hole; the third routing hole corresponds to the second routing hole; the camera is provided with a fourth routing hole; and the second cable is threaded out of the fourth routing hole and the third routing hole in sequence, and extends through the second routing hole to the accommodating cavity.

As the improvement of the present disclosure, the antenna is provided with a connection cable; and the connection cable is electrically connected to the camera through the fourth routing hole.

As the improvement of the present disclosure, a second fixing member and a second cable collection slot are arranged in the camera; the second cable and the connection cable are disposed in a manner of passing through the second cable collection slot; and the second fixing member is connected to an inner wall of the camera and presses the second cable and the connection cable.

The present disclosure also provides a recreational vehicle camera with a marker light, including: a mounting housing, wherein the mounting housing is provided with an accommodating cavity, a first routing hole and a second routing hole, and both the first routing hole and the second routing hole are communicated to the accommodating cavity; a lamp body assembly, wherein the lamp body assembly is provided with a first cable; the lamp body assembly is mounted on one side of the mounting housing close to the first routing hole; the first cable extends through the first routing hole to the accommodating cavity; a camera assembly, wherein the camera assembly is provided with a second cable; the camera assembly is mounted on one side of the mounting housing close to the second routing hole; the second cable extends through the second routing hole to the accommodating cavity; and a rear mounting cover, wherein the rear mounting cover is used for being fixedly connected to a recreational vehicle; the rear mounting cover covers the accommodating cavity; and the first cable and the second cable are threaded out of the rear mounting cover and are electrically connected to a circuit in the recreational vehicle.

As the improvement of the present disclosure, an insertion block is arranged at one end of the rear mounting cover; a clamping block is arranged at the other end of the rear mounting cover; an insertion hole is formed in one end of the mounting housing; a clamping slot is formed in the other end of the mounting housing; the insertion block is inserted into the insertion hole; and the clamping block is clamped to the clamping slot.

As the improvement of the present disclosure, the mounting housing further includes a first fixing member; a first cable collection slot is arranged in the accommodating cavity; the first cable and the second cable are disposed in a manner of passing through the first cable collection slot; the first fixing member is connected to an inner wall of the accommodating cavity and presses the first cable and the second cable.

As the improvement of the present disclosure, further including a mounting pad, wherein the rear mounting cover is provided with a first cable outlet hole; the mounting pad is provided with a second cable outlet hole; the second cable outlet hole corresponds to the first cable outlet hole; and the mounting pad is mounted between the rear mounting cover and an outer wall of the recreational vehicle.

As the improvement of the present disclosure, the camera assembly includes a mounting seat, a camera and an antenna; the antenna is arranged at a top of the mounting seat; the mounting seat is provided with a shaft hole; the camera is provided with a rotating shaft; the rotating shaft is inserted into the shaft hole; and the camera is rotatably connected to the mounting seat.

As the improvement of the present disclosure, a stop block is arranged on one side of the mounting seat facing the camera in a protruding manner; several stop slots are arranged on a surface of the camera; and when the camera rotates relative to the mounting seat, the stop block slides on surfaces of the stop slots.

As the improvement of the present disclosure, the antenna includes a mounting portion and a main body portion; the main body portion is rotatably connected to the mounting portion; and the mounting portion is mounted on the mounting seat.

As the improvement of the present disclosure, the mounting seat is provided with a third routing hole; the third routing hole corresponds to the second routing hole; the camera is provided with a fourth routing hole; and the second cable is threaded out of the fourth routing hole and the third routing hole in sequence, and extends through the second routing hole to the accommodating cavity.

As the improvement of the present disclosure, the antenna is provided with a connection cable; and the connection cable is electrically connected to the camera through the fourth routing hole.

As the improvement of the present disclosure, a second fixing member and a second cable collection slot are arranged in the camera; the second cable and the connection cable are disposed in a manner of passing through the second cable collection slot; and the second fixing member is connected to an inner wall of the camera and presses the second cable and the connection cable.

Beneficial effects: based on the above structural arrangement, during use, the first cable passes through the first routing hole and enters the accommodating cavity; the second cable passes through the second routing hole and enters the accommodating cavity; the rear mounting cover covers the accommodating cavity, which can effectively restrain the cables, prevent the cables from being exposed out of a product and prolong the service life of the product. Furthermore, both the first cable and the second cable are threaded out of the first routing hole and are effectively electrically connected with the circuit in the recreational vehicle. A wire harness put in order is neat and clear, which facilitates a user to connect and mount the product.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
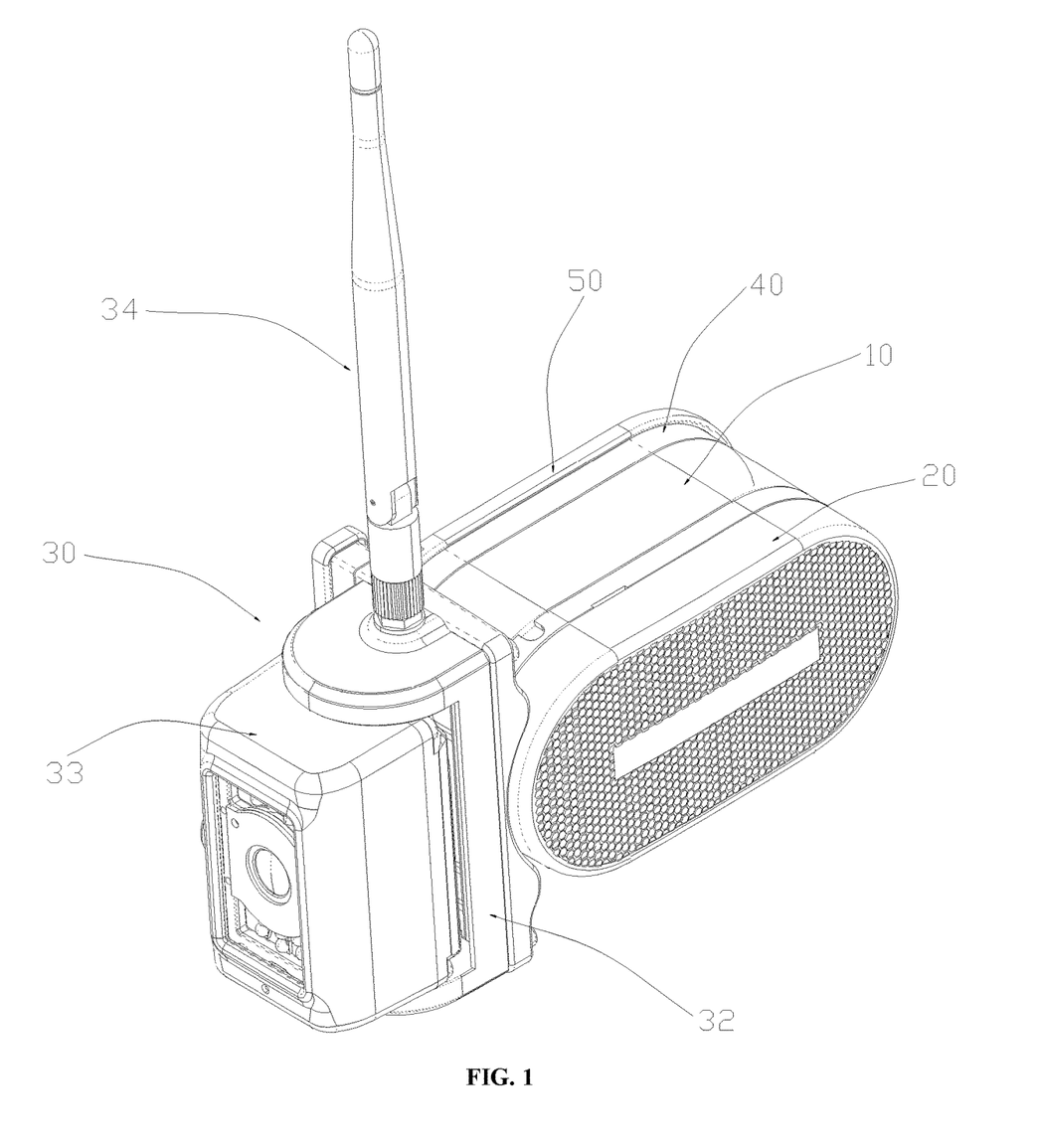
FIG. 1 is a schematic diagram of an overall structure of the present disclosure.
Figure 2:
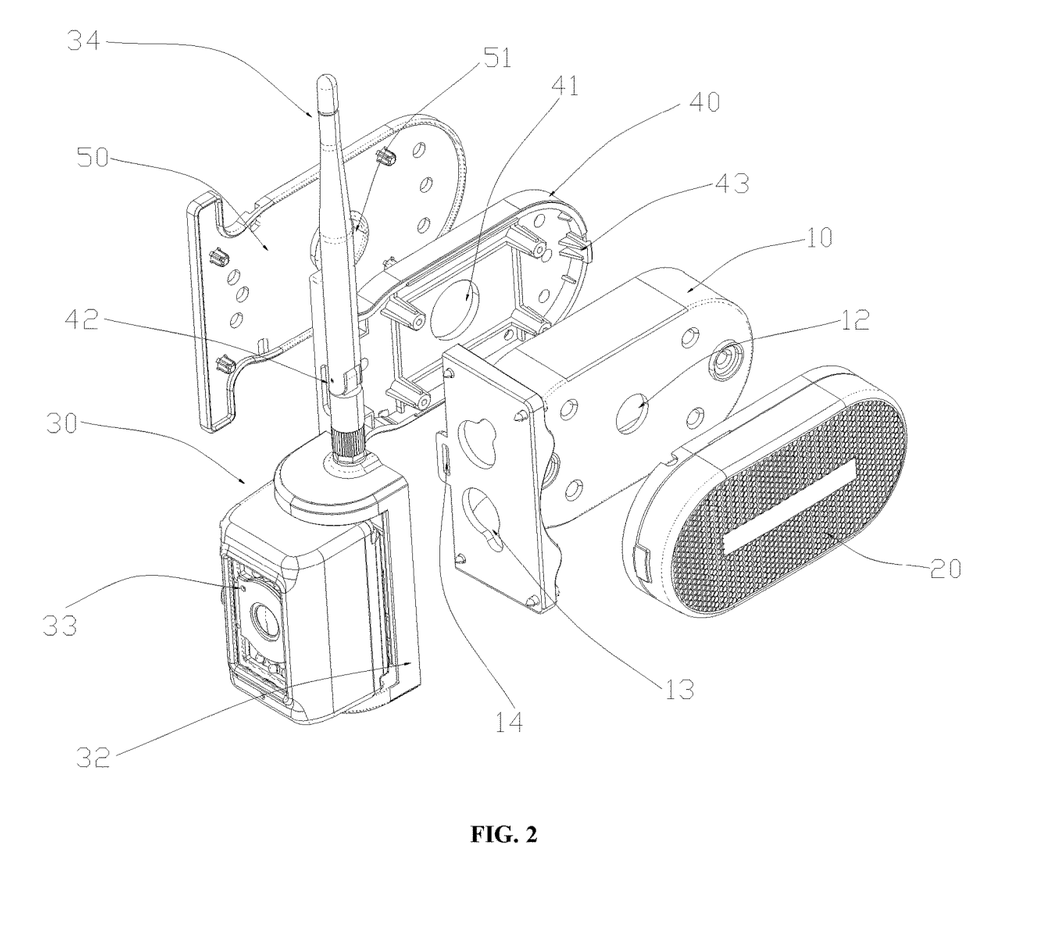
FIG. 2 is a first schematic exploded structural diagram of the present disclosure.
Figure 3:
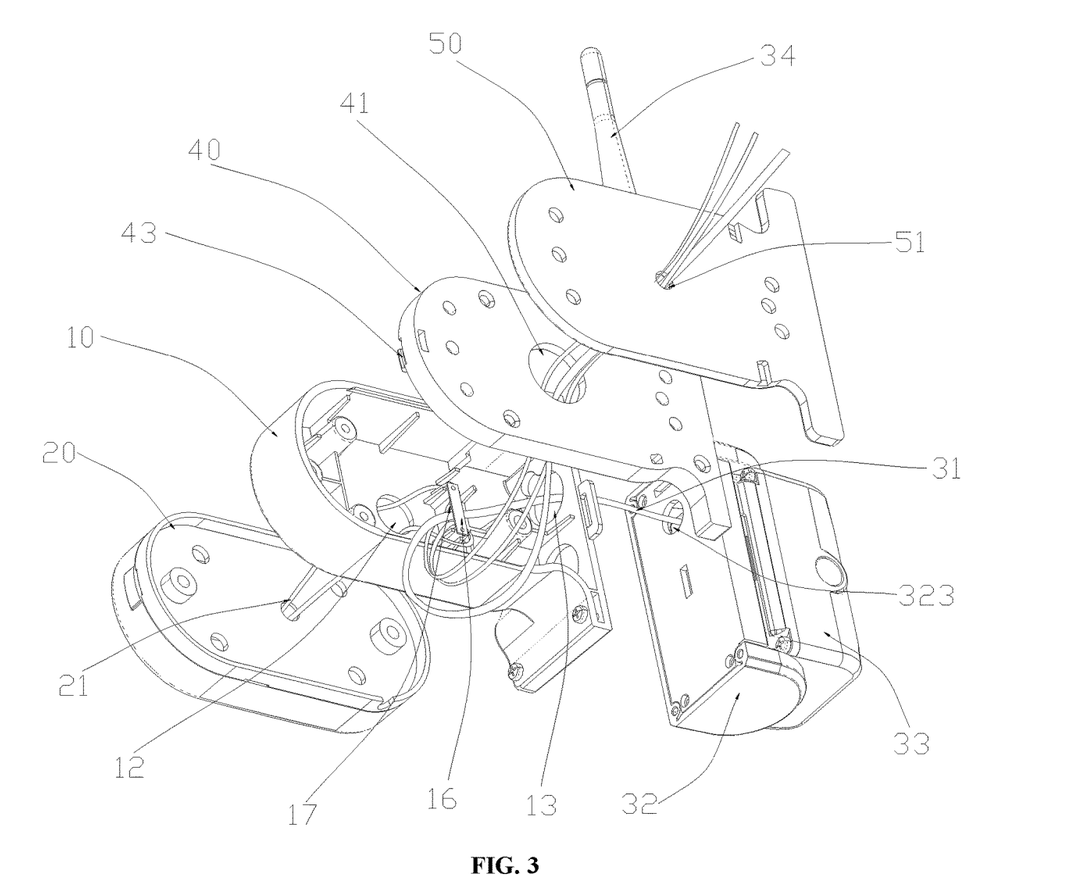
FIG. 3 is a second schematic exploded structural diagram of the present disclosure.
Figure 4:
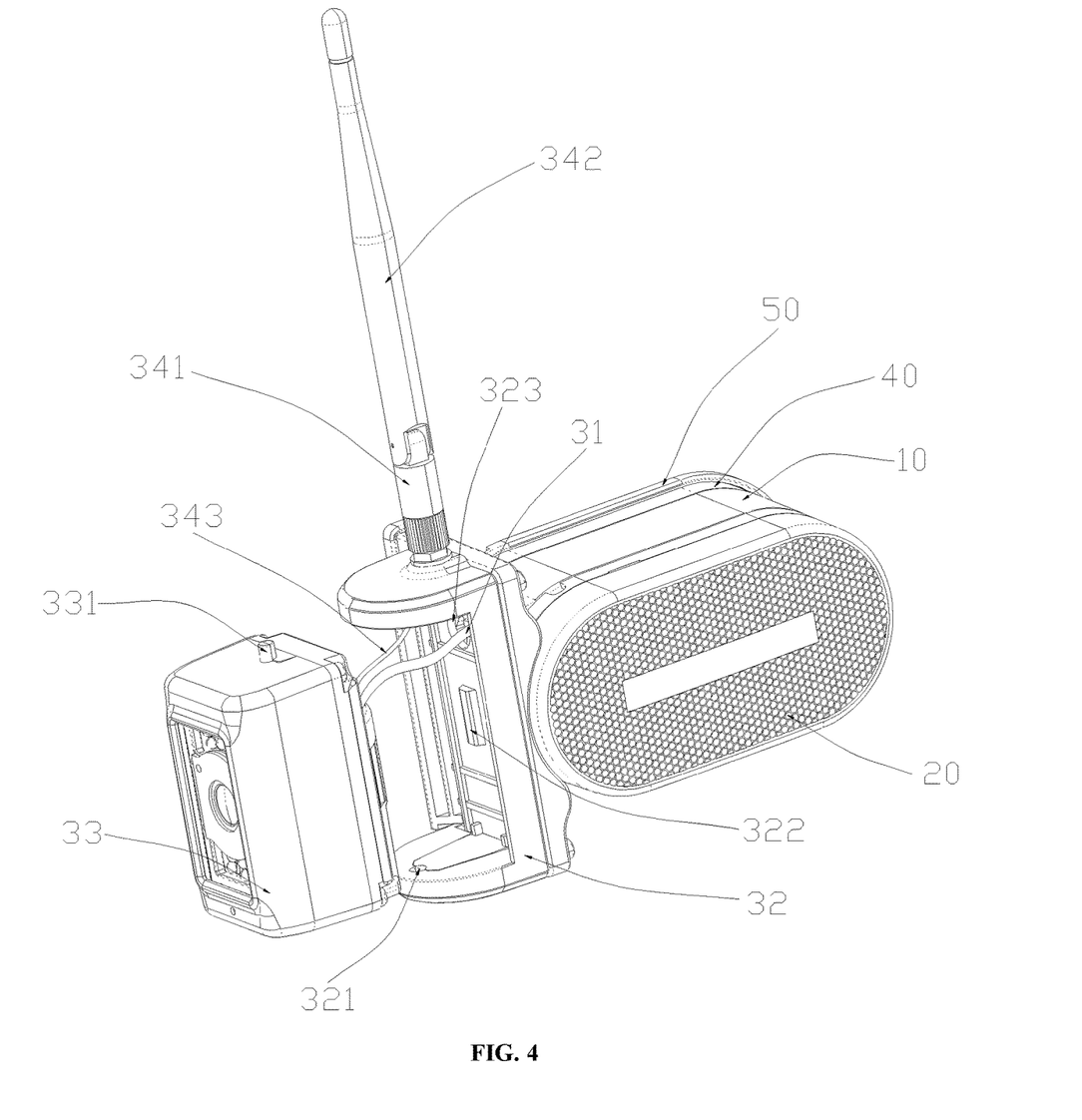
FIG. 4 is a third schematic exploded structural diagram of the present disclosure.
Figure 5:
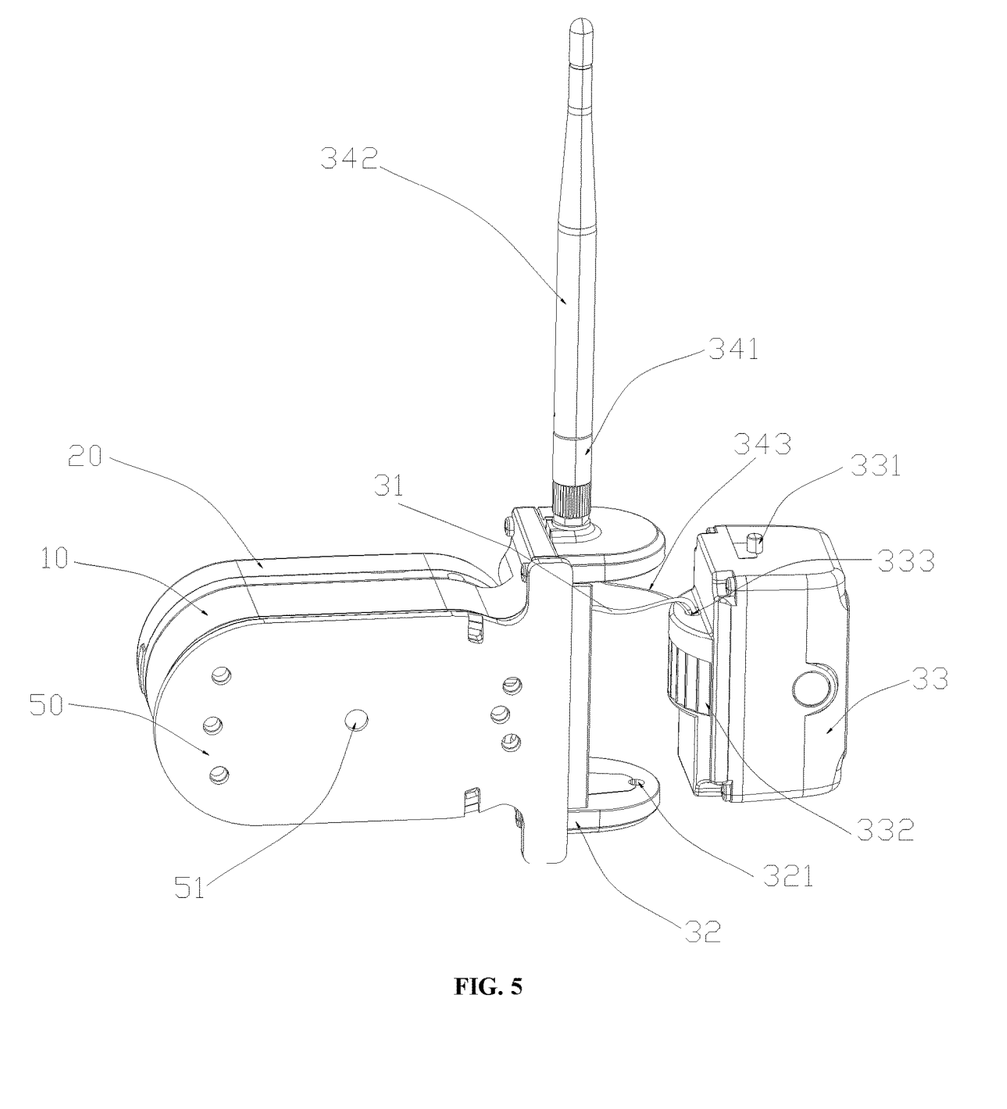
FIG. 5 is a fourth schematic exploded structural diagram of the present disclosure.
Figure 6:
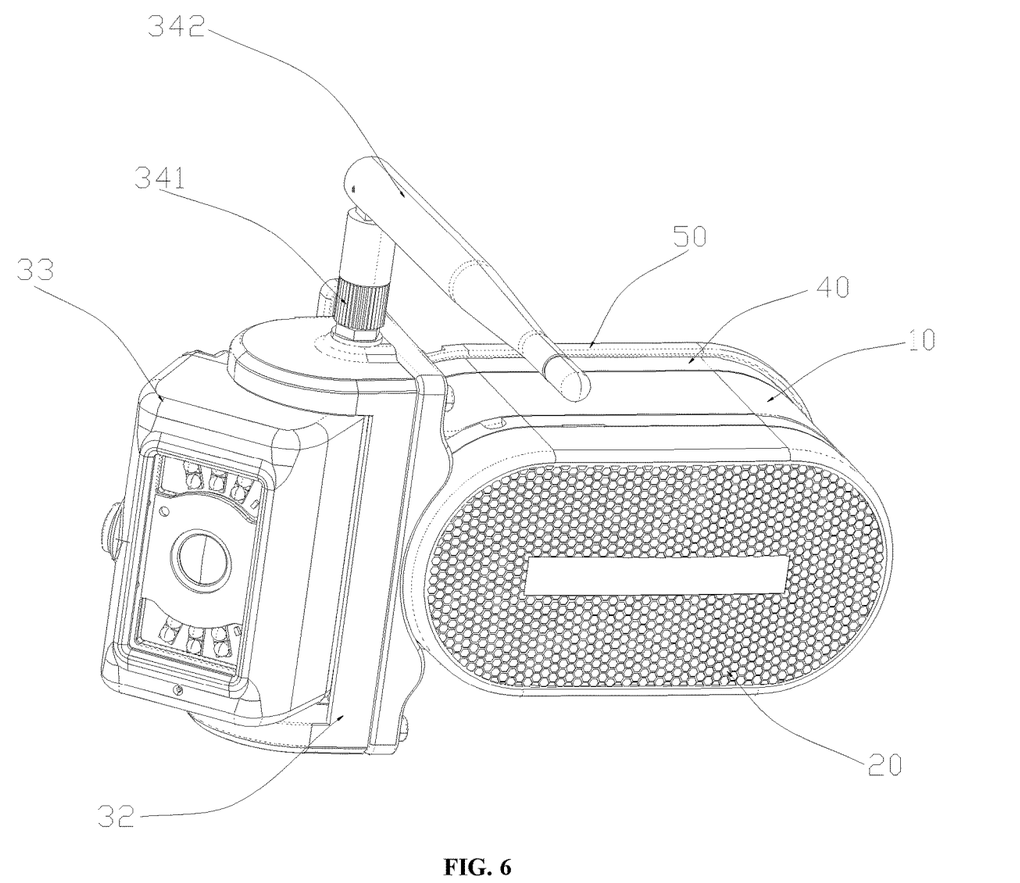
FIG. 6 is a first usage state diagram of the present disclosure.
Figure 7:
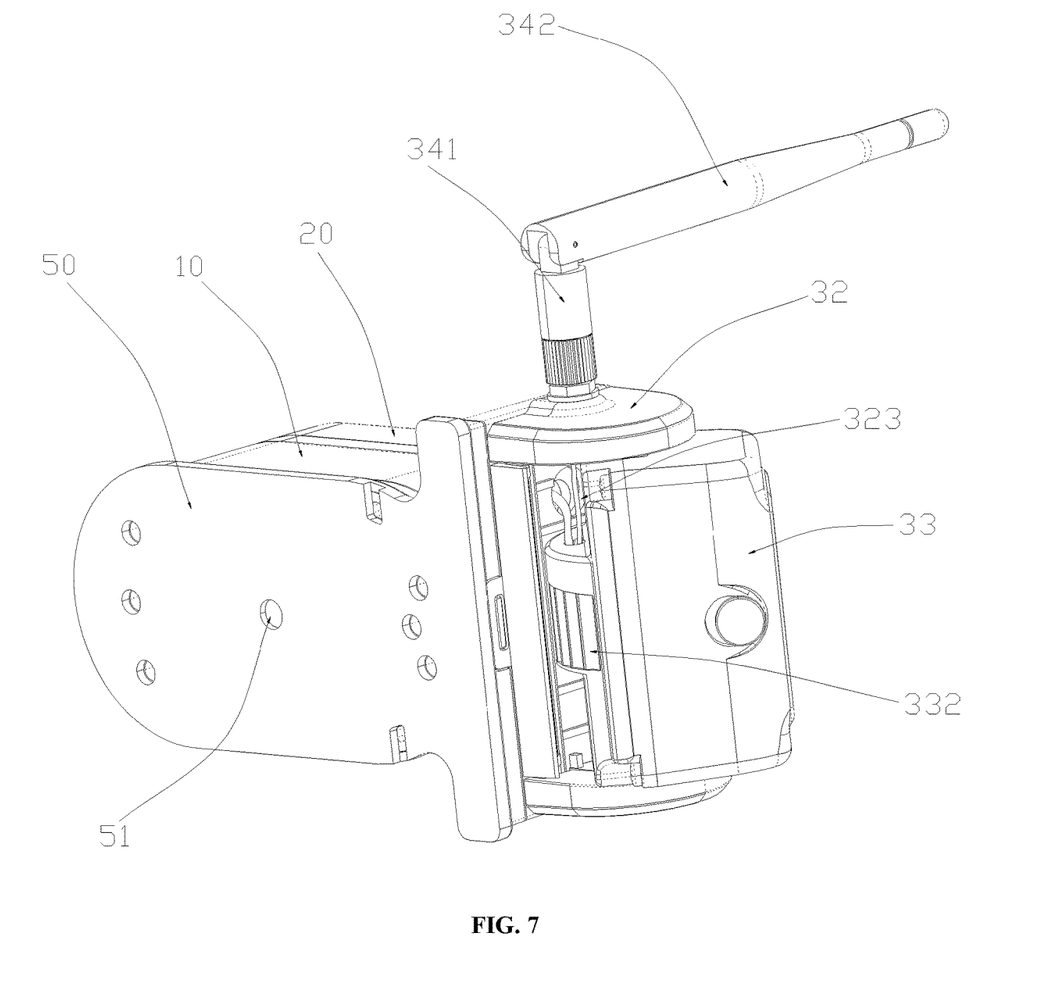
FIG. 7 is a second usage state diagram of the present disclosure.
Figure 8:
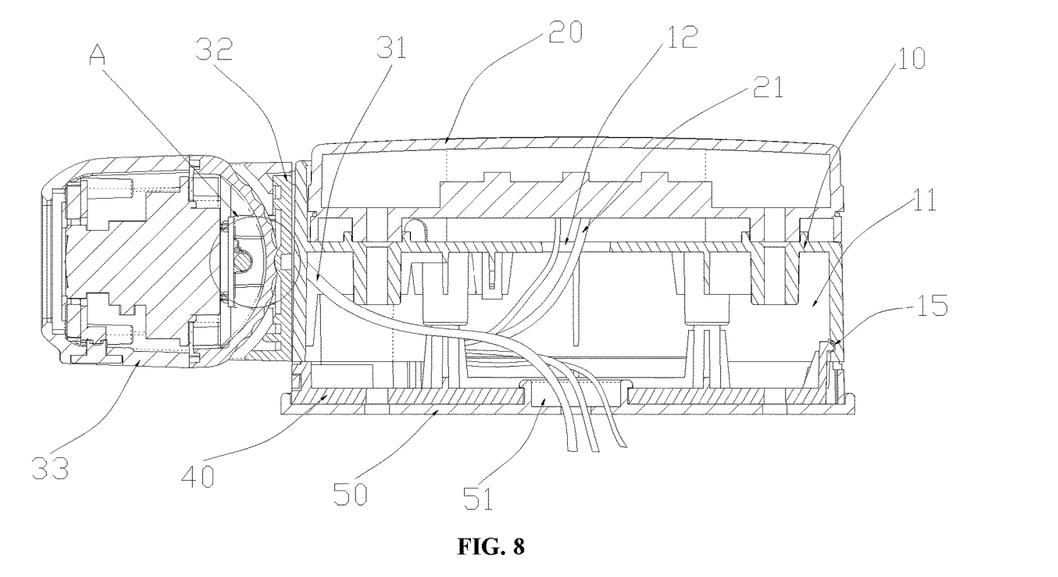
FIG. 8 is a schematic sectional structural diagram of the present disclosure.
Figure 9:
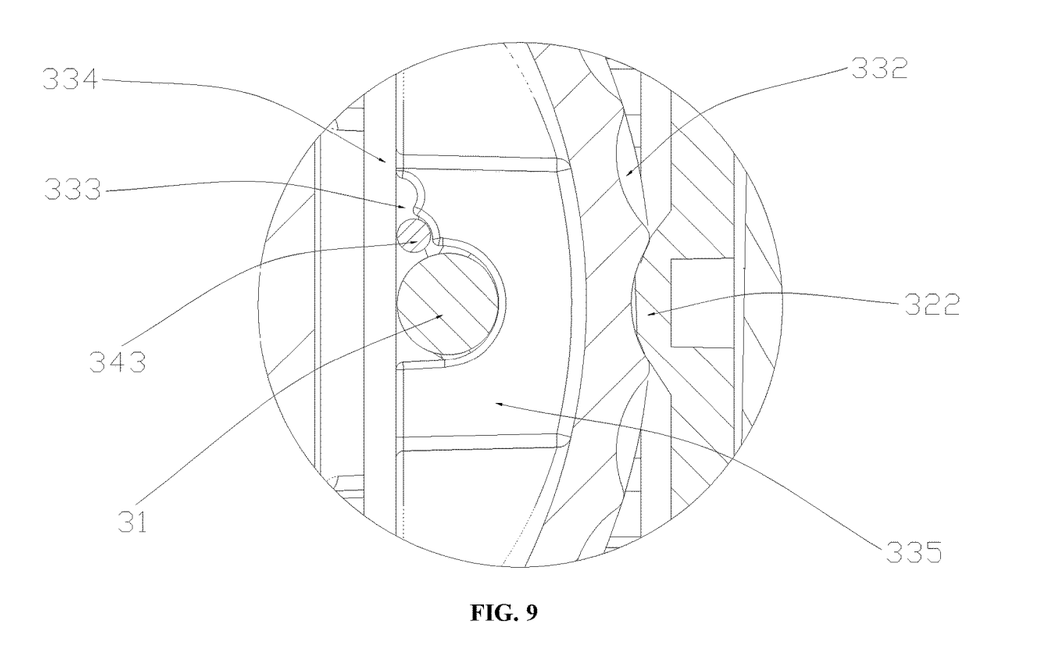
FIG. 9 is an enlarged diagram of circle A of FIG. 8.

Referring to FIG. 1 to FIG. 9, a recreational vehicle camera with a marker light includes:

a mounting housing 10, wherein the mounting housing 10 is provided with an accommodating cavity 11, a first routing hole 12 and a second routing hole 13, and both the first routing hole 12 and the second routing hole 13 are communicated to the accommodating cavity 11;

a lamp body assembly 20, wherein the lamp body assembly 20 is provided with a first cable 21; the lamp body assembly 20 is mounted on one side of the mounting housing 10 close to the first routing hole 12; the first cable 21 extends through the first routing hole 12 to the accommodating cavity 11;

a camera assembly 30, wherein the camera assembly 30 is provided with a second cable 31; the camera assembly 30 is mounted on one side of the mounting housing 10 close to the second routing hole 13; the second cable 31 extends through the second routing hole 13 to the accommodating cavity 11; and a rear mounting cover 40, wherein the rear mounting cover 40 is provided with a first cable outlet hole 41; the rear mounting cover 40 is used for being fixedly connected to a recreational vehicle; the rear mounting cover 40 detachably covers the accommodating cavity 11; and the first cable 21 and the second cable 31 are threaded out of the first cable outlet hole 41 and are electrically connected to a circuit in the recreational vehicle.

Based on the above structural arrangement, during use, the first cable passes through the first routing hole and enters the accommodating cavity; the second cable passes through the second routing hole and enters the accommodating cavity; the rear mounting cover covers the accommodating cavity, which can effectively restrain the cables, prevent the cables from being exposed out of a product and prolong the service life of the product. Furthermore, both the first cable and the second cable are threaded out of the first routing hole and are effectively electrically connected with the circuit in the recreational vehicle. A wire harness put in order is neat and clear, which facilitates a user to connect and mount the product.

In this embodiment, an insertion block 42 is arranged at one end of the rear mounting cover 40; a clamping block 43 is arranged at the other end of the rear mounting cover 40; an insertion hole 14 is formed in one end of the mounting housing 10; a clamping slot 15 is formed in the other end of the mounting housing 10; the insertion block 42 is inserted into the insertion hole 14; and the clamping block 43 is clamped to the clamping slot 15. Based on the above structural arrangement, during use, the insertion block is inserted along the insertion hole. At this time, the insertion block abuts against an inner wall of the insertion hole. The other end of the rear mounting cover is pressed to clamp the clamping block in the clamping slot. By means of the simple structure, connection between the rear mounting cover and the mounting housing can be quickly realized, which facilitates the user to assemble the product and to use the product conveniently.

In this embodiment, the mounting housing 10 further includes a first fixing member 16; a first cable collection slot 17 is arranged in the accommodating cavity 11; the first cable 21 and the second cable 31 are disposed in a manner of passing through the first cable collection slot 17; the first fixing member 16 is connected to an inner wall of the accommodating cavity 11 and presses the first cable 21 and the second cable 31. Based on the above structural arrangement, during use, the first cable and the second cable pass through the first cable collection slot, and the first fixing member is connected to the inner wall of the accommodating cavity. At this time, the first fixing member presses the first cable and the second cable to effectively fix the first cable and the second cable and prevent the cables from being pulled when the first cable and the second cable are electrically connected to the circuit in the recreational vehicle, so that the first cable and the second cable are kept stable all the time. The stability of the product is improved; a deviation of the cables in the product is prevented; and the safety of the product is improved.

In this embodiment, the recreational vehicle camera with the marker light further includes a mounting pad 50; the mounting pad 50 is provided with a second cable outlet hole 51; the second cable outlet hole 51 corresponds to the first cable outlet hole 41; and the mounting pad 50 is mounted between the rear mounting cover and an outer wall of the recreational vehicle. Based on the above structural arrangement, during use, the first cable and the second cable are threaded out of the first cable outlet hole and the second cable outlet hole in sequence and are electrically connected to the circuit in the recreational vehicle. The mounting pad can provide buffering between the rear mounting cover and the outer wall of the recreational vehicle, thereby prolonging the service life of the product and ensuring the stability of the product.

In this embodiment, the camera assembly 30 includes a mounting seat 32, a camera 33 and an antenna 34; the antenna 34 is arranged at a top of the mounting seat 32; the mounting seat 32 is provided with a shaft hole 321; the camera 33 is provided with a rotating shaft 331; the rotating shaft 331 is inserted into the shaft hole 321; and the camera 33 is rotatably connected to the mounting seat 32. Based on the above structural arrangement, during use, the rotating shaft is matched with the shaft hole, so that the camera is rotatably arranged on the mounting seat. During use, the user can adjust an orientation of the camera as required, so that the user can clearly observe an environment around the recreational vehicle, and the applicability of the product is improved. Furthermore, the antenna can emit signals to transmit monitored pictures to a display device through the signals, which facilitates the user to remotely learn conditions around the recreational vehicle.

In this embodiment, a stop block 322 is arranged on one side of the mounting seat 32 facing the camera 33 in a protruding manner; several stop slots 332 are arranged on a surface of the camera 33; and when the camera 33 rotates relative to the mounting seat 32, the stop block 322 slides on surfaces of the stop slots 332. Based on the above structural arrangement, during use, when the camera is rotated, the camera and the mounting seat rotate relatively. The stop block slides along the surfaces of the stop slots and is located in one stop slot. Due to cooperation between the stop block and the stop slot, the position of the camera can be limited while the relative rotation between the camera and the mounting seat is guaranteed, so that the camera is fixed in a specific angle and is prevented from being rotated accidentally.

In this embodiment, the antenna 34 includes a mounting portion 341 and a main body portion 342; the main body portion 342 is rotatably connected to the mounting portion 341; and the mounting portion 341 is mounted on the mounting seat 32. Based on the above structural arrangement, the main body portion can rotate relative to the mounting portion, so that the user can adjust an orientation of the antenna to conveniently receive the signals, and the convenience of use of the product is improved.

In this embodiment, the mounting seat 32 is provided with a third routing hole 323; the third routing hole 323 corresponds to the second routing hole; 13 the camera 33 is provided with a fourth routing hole 333; and the second cable 31 is threaded out of the fourth routing hole 333 and the third routing hole 323 in sequence, and extends through the second routing hole 13 to the accommodating cavity 11. Based on the above structural arrangement, during use, the second cable extends to the accommodating cavity along the fourth routing hole, the third routing hole and the second routing hole, is threaded out via the first cable outlet hole and the second cable outlet hole, and is electrically connected to the circuit in the recreational vehicle, so that the second cable can be effectively protected, and electrical connection can also be effectively achieved. The structure is simple, and the design is reasonable.

In this embodiment, the antenna 34 is provided with a connection cable 343; and the connection cable 343 is electrically connected to the camera 33 through the fourth routing hole 333. Based on the above structural arrangement, the connection cable can achieve the electrical connection between the camera and the antenna, and monitoring signals of the camera can be transmitted through the antenna, so that the user can receive the monitoring signals remotely, and the product can continuously and stably run.

In this embodiment, a second fixing member 334 and a second cable collection slot 335 are arranged in the camera 33; the second cable 31 and the connection cable 343 are disposed in a manner of passing through the second cable collection slot 335; and the second fixing member 334 is connected to an inner wall of the camera 33 and presses the second cable 31 and the connection cable 343. Based on the above structural arrangement, during use, the second cable and the connection cable pass through the fourth routing hole and enter the camera, and pass, in the camera, through the second cable collection slot, and the second fixing member is connected to the inner wall of the camera. At this time, the second fixing member presses the second cable and the connection cable to effectively fix the second cable and the connection cable, which prevents the connection cable from being broken, so that the second cable and the connection cable are kept stable all the time, and the stability of the product is improved.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A recreational vehicle camera with a turn lamp, comprising:
    a mounting housing, wherein the mounting housing is provided with an accommodating cavity, a first routing hole and a second routing hole, and both the first routing hole and the second routing hole are communicated to the accommodating cavity;
    a lamp body assembly, wherein the lamp body assembly is provided with a first cable; the lamp body assembly is mounted on one side of the mounting housing close to the first routing hole; the first cable extends through the first routing hole to the accommodating cavity;
    a camera assembly, wherein the camera assembly is provided with a second cable; the camera assembly is mounted on one side of the mounting housing close to the second routing hole; the second cable extends through the second routing hole to the accommodating cavity; and
    a rear mounting cover, wherein the rear mounting cover is provided with a first cable outlet hole; the rear mounting cover is used for being fixedly connected to a recreational vehicle; the rear mounting cover detachably covers the accommodating cavity; and the first cable and the second cable are threaded out of the first cable outlet hole and are electrically connected to a circuit in the recreational vehicle;
    wherein the camera assembly comprises a mounting seat, a camera and an antenna; the antenna is arranged at a top of the mounting seat; the mounting seat is provided with a shaft hole; the camera is provided with a rotating shaft; the rotating shaft is inserted into the shaft hole; and the camera is rotatably connected to the mounting seat;
    wherein a stop block is arranged on one side of the mounting seat facing the camera in a protruding manner; several stop slots are arranged on a surface of the camera; and when the camera rotates relative to the mounting seat, the stop block slides on surfaces of the stop slots.

2. The recreational vehicle camera with the turn lamp according to claim 1, wherein an insertion block is arranged at one end of the rear mounting cover; a clamping block is arranged at the other end of the rear mounting cover; an insertion hole is formed in one end of the mounting housing; a clamping slot is formed in the other end of the mounting housing; the insertion block is inserted into the insertion hole; and the clamping block is clamped to the clamping slot.

3. The recreational vehicle camera with the turn lamp according to claim 1, wherein the mounting housing further comprises a first fixing member; a first cable collection slot is arranged in the accommodating cavity; the first cable and the second cable are disposed in a manner of passing through the first cable collection slot; the first fixing member is connected to an inner wall of the accommodating cavity and presses the first cable and the second cable.

4. The recreational vehicle camera with the turn lamp according to claim 1, further comprising a mounting pad, wherein the mounting pad is provided with a second cable outlet hole; the second cable outlet hole corresponds to the first cable outlet hole; and the mounting pad is mounted between the rear mounting cover and an outer wall of the recreational vehicle.

5. The recreational vehicle camera with the turn lamp according to claim 1, wherein the antenna comprises a mounting portion and a main body portion; the main body portion is rotatably connected to the mounting portion; and the mounting portion is mounted on the mounting seat.

6. The recreational vehicle camera with the turn lamp according to claim 1, wherein the mounting seat is provided with a third routing hole; the third routing hole corresponds to the second routing hole; the camera is provided with a fourth routing hole; and the second cable is threaded out of the fourth routing hole and the third routing hole in sequence, and extends through the second routing hole to the accommodating cavity.

7. The recreational vehicle camera with the turn lamp according to claim 6, wherein the antenna is provided with a connection cable; and the connection cable is electrically connected to the camera through the fourth routing hole.

8. The recreational vehicle camera with the turn lamp according to claim 6, wherein a second fixing member and a second cable collection slot are arranged in the camera; the second cable and the connection cable are disposed in a manner of passing through the second cable collection slot; and the second fixing member is connected to an inner wall of the camera and presses the second cable and the connection cable.

9. A recreational vehicle camera with a turn lamp, comprising:
- a mounting housing, wherein the mounting housing is provided with an accommodating cavity, a first routing hole and a second routing hole, and both the first routing hole and the second routing hole are communicated to the accommodating cavity;
- a lamp body assembly, wherein the lamp body assembly is provided with a first cable; the lamp body assembly is mounted on one side of the mounting housing close to the first routing hole; the first cable extends through the first routing hole to the accommodating cavity;
- a camera assembly, wherein the camera assembly is provided with a second cable; the camera assembly is mounted on one side of the mounting housing close to the second routing hole; the second cable extends through the second routing hole to the accommodating cavity; and
- a rear mounting cover, wherein the rear mounting cover is used for being fixedly connected to a recreational vehicle; the rear mounting cover covers the accommodating cavity; and the first cable and the second cable are threaded out of the rear mounting cover and are electrically connected to a circuit in the recreational vehicle;
- wherein the camera assembly comprises a mounting seat, a camera and an antenna; the antenna is arranged at a top of the mounting seat the mounting seat is provided with a shaft hole; the camera is provided with a rotating shaft the rotating shaft is inserted into the shaft hole; and the camera is rotatably connected to the mounting seat;
- wherein a stop block is arranged on one side of the mounting seat facing the camera in a protruding manner; several stop slots are arranged on a surface of the camera; and when the camera rotates relative to the mounting seat, the stop block slides on surfaces of the stop slots.

10. The recreational vehicle camera with the turn lamp according to claim 9, wherein an insertion block is arranged at one end of the rear mounting cover; a clamping block is arranged at the other end of the rear mounting cover; an insertion hole is formed in one end of the mounting housing; a clamping slot is formed in the other end of the mounting housing; the insertion block is inserted into the insertion hole; and the clamping block is clamped to the clamping slot.

11. The recreational vehicle camera with the turn lamp according to claim 9, wherein the mounting housing further comprises a first fixing member; a first cable collection slot is arranged in the accommodating cavity; the first cable and the second cable are disposed in a manner of passing through the first cable collection slot; the first fixing member is connected to an inner wall of the accommodating cavity and presses the first cable and the second cable.

12. The recreational vehicle camera with the turn lamp according to claim 9, further comprising a mounting pad, wherein the rear mounting cover is provided with a first cable outlet hole; the mounting pad is provided with a second cable outlet hole; the second cable outlet hole corresponds to the first cable outlet hole; and the mounting pad is mounted between the rear mounting cover and an outer wall of the recreational vehicle.

13. The recreational vehicle camera with the turn lamp according to claim 9, wherein the antenna comprises a mounting portion and a main body portion; the main body portion is rotatably connected to the mounting portion; and the mounting portion is mounted on the mounting seat.

14. The recreational vehicle camera with the turn lamp according to claim 9, wherein the mounting seat is provided with a third routing hole; the third routing hole corresponds to the second routing hole; the camera is provided with a fourth routing hole; and the second cable is threaded out of the fourth routing hole and the third routing hole in sequence, and extends through the second routing hole to the accommodating cavity.

15. The recreational vehicle camera with the turn lamp according to claim 14, wherein the antenna is provided with a connection cable; and the connection cable is electrically connected to the camera through the fourth routing hole.

16. The recreational vehicle camera with the turn lamp according to claim 14, wherein a second fixing member and a second cable collection slot are arranged in the camera; the second cable and the connection cable are disposed in a manner of passing through the second cable collection slot; and the second fixing member is connected to an inner wall of the camera and presses the second cable and the connection cable.

* * * * *